(12) United States Patent
Wilkes

(10) Patent No.: US 9,131,805 B1
(45) Date of Patent: Sep. 15, 2015

(54) ULTIMATE TACO SHAPER

(71) Applicant: Timothy Wilkes, San Clemente, CA (US)

(72) Inventor: Timothy Wilkes, San Clemente, CA (US)

( * ) Notice: Subject to any disclaimer, the term of this patent is extended or adjusted under 35 U.S.C. 154(b) by 0 days.

(21) Appl. No.: 13/999,529

(22) Filed: Mar. 7, 2014

(51) Int. Cl.
*A47J 37/06* (2006.01)
*A47J 37/12* (2006.01)
*A47J 9/00* (2006.01)
*A47J 37/10* (2006.01)

(52) U.S. Cl.
CPC .............. *A47J 37/1295* (2013.01); *A47J 9/007* (2013.01); *A47J 37/108* (2013.01)

(58) Field of Classification Search
CPC ................................ A47J 37/108; A47J 9/007
USPC ............. 99/359, 409, 426, 427, 431; 425/275
See application file for complete search history.

(56) References Cited

U.S. PATENT DOCUMENTS

| | | | | |
|---|---|---|---|---|
| 2,664,812 A | * | 1/1954 | Molina | 249/120 |
| 2,775,929 A | * | 1/1957 | Johnson et al. | 99/426 |
| 2,778,294 A | * | 1/1957 | Ulloa | 99/426 |
| 3,020,826 A | * | 2/1962 | Silva | 99/426 |
| 3,693,537 A | * | 9/1972 | Johnson et al. | 99/426 |
| 3,745,911 A | * | 7/1973 | Kennedy et al. | 99/426 |
| 3,759,163 A | * | 9/1973 | Walker | 99/336 |
| 3,817,163 A | * | 6/1974 | Kizziar et al. | 99/353 |
| 4,154,156 A | * | 5/1979 | Brignall | 99/426 |
| 4,494,454 A | * | 1/1985 | Sparks | 99/426 |
| 4,517,887 A | * | 5/1985 | Childress | 99/426 |
| 5,937,743 A | * | 8/1999 | Overstreet | 99/426 |
| D503,593 S | * | 4/2005 | Walker | D7/672 |
| 2008/0028950 A1 | * | 2/2008 | Vasquez | 99/426 |

* cited by examiner

*Primary Examiner* — Nina Bhat
(74) *Attorney, Agent, or Firm* — Integrity Patent Group PLC

(57) ABSTRACT

The Ultimate Taco Shaper is a tortilla shaping device which includes a rounded taco shell shaped portion of the device which is smaller than the tortilla and shapes the tortilla into a taco shape having a more circular u-shaped shell having a larger filling capacity. The taco shaping device includes clip portion that moves in and out which holds the tortilla in place while cooking thereby forming a more rounded u-shaped taco shell.

7 Claims, 4 Drawing Sheets

ULTIMATE TACO SHAPER

There is no federally sponsored or research or development associated with this application.

There is no joint research agreement associated with this application.

BACKGROUND OF THE INVENTION (1) Field of the Invention

The Ultimate Taco Shaper is a unique taco shaper compared to other existing products that will shape the taco and place the taco onto a surface.

(2) Description of the Art Including Information Disclosed Under 37 CFR 1.97 & 1.98

The art described in the drawings of the design and utility function illustrate the unique ability of the invention. There are two patents Vasquez U.S. Pat. No. 7,866,257 B2 and Brignall U.S. Pat. No. 4,154,155 that we used as a reference to establishing claims.

BRIEF SUMMARY OF THE INVENTION

The "Ultimate Taco Shaper" is a new kitchen gadget shaping device that forms a tortilla into a taco shell having a more circular u-shaped taco shell having a larger filling capacity that the known v-shaped taco shells.

DETAILED DESCRIPTION OF THE PREFERRED EMBODIMENT

Figure 4:
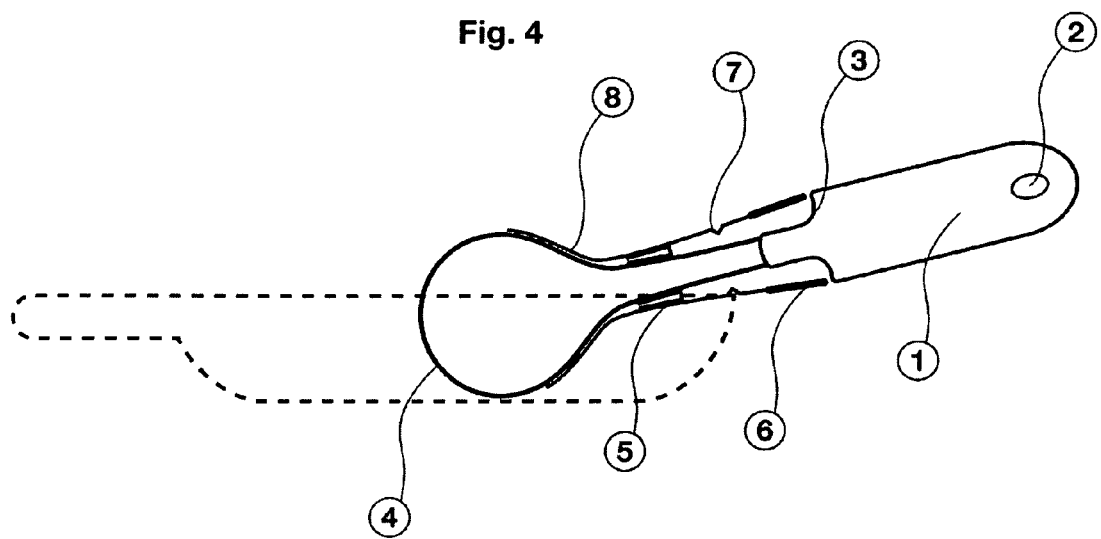
FIG. 4 is the top view of the taco shell shaping device disposed within a shallow pan.

The frying pan in broken lines of FIG. 4 is not a part of this specification and is only for illustration purposes.

Figure 1:
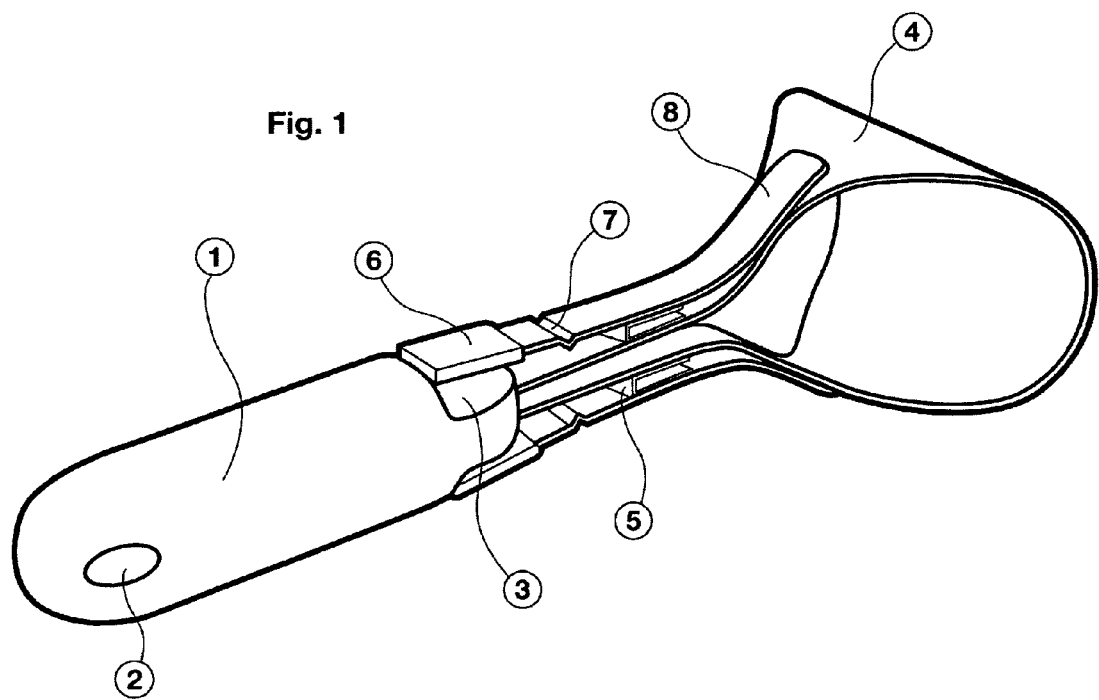
FIG. 1 is the top side angle overview of the shaping device.

In FIG. 1 is the body of the handle with #2 the hole in the handle for hanging with #3 the inset portion of the handle to allow the pressed end of the clip to flow easily with #4 the body of the rounded end that makes the shape a round circular taco shell shape slightly smaller than the tortilla with #5 the spring loaded clip hinge that allows the in and out movement of the clip with #6 the thumb and finger portion that is pressed inward to open the clip with #7 the notch for the shaper to set on the side of the frying pan so that it will not move with #8 the end of the clip that holds the taco shell in place while being used to fry the shell in oil and will release the shell onto a surface in an upright position.

Figure 2:
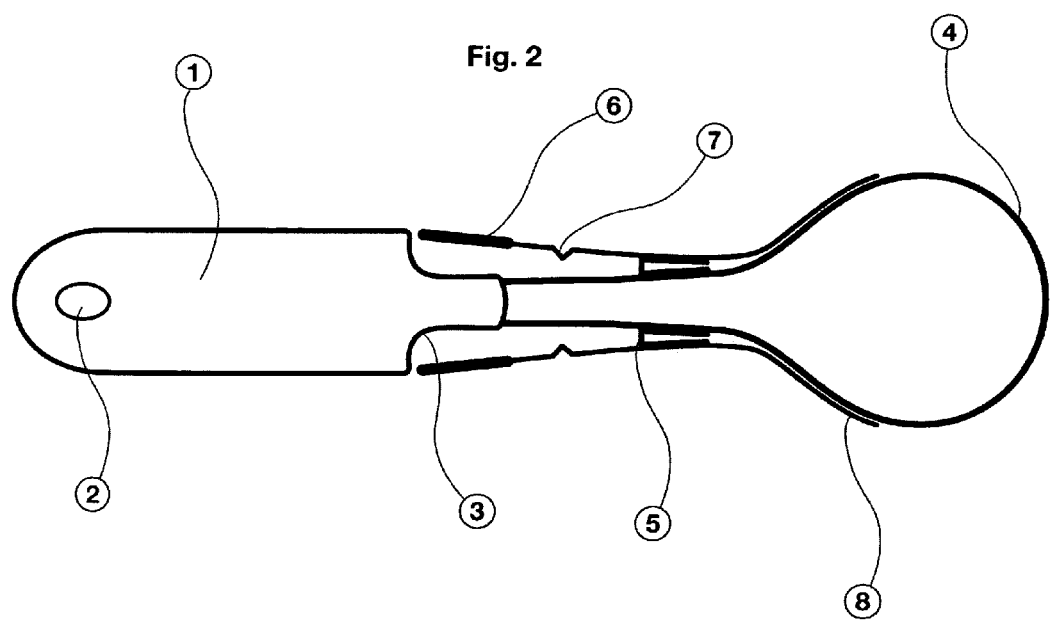
FIG. 2 is the top view of the taco shell shaping device.

In FIG. 2 is the body of the handle with #3 the inset portion of the handle with #4 the body of the shaper end for the round circular taco shell shape slightly smaller than the tortilla with #6 the thumb and finger portion of the clip with #7 the notch for the clip to set on the side of the frying pan with #8 the end of the clip that holds the taco shell in place while in use.

Figure 3:
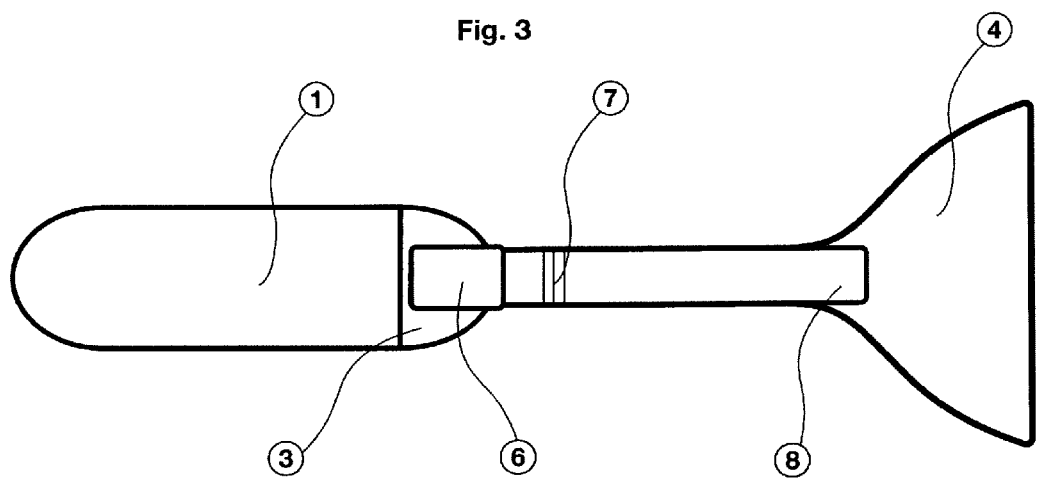
FIG. 3 is the die view of the taco shell shaping device.

FIG. 3 it shows the invention set into a pan with broken lines with #1 the body of the handle with #2 the hole in the handle for hanging the shaper with #3 the inset portion of the handle with #4 the body of the round circular taco shell shape end slightly smaller than the tortilla with #5 the spring loaded clip that moves the clip in and out with #6 the thumb and finger portion of the clip to press the clip in and out with #7 the notch in the clip to set it on the side of the frying pan so it will not move with #8 the end of the clip that holds the taco shell in place while in use frying the taco shell and to be used for releasing the shell on a surface.

FIG. 4 shows the broken lines of a frying pan with the invention inside the pan with #1 the body of the handle with #2 the hole in the handle for hanging the shaper with #3 the inset portion of the handle with #4 the body of the round circular taco shell shape end slightly smaller than the tortilla with #5 the spring loaded clip that moves the clip in and out with #6 the thumb and finger portion of the clip to press the clip in and out with #7 the notch in the clip to set it on the side of the frying pan so it will not move with #8 the end of the clip that holds the taco shell in place while in use frying the taco shell and to be used for releasing the shell on a surface.

DETAILED DESCRIPTION OF THE INVENTION

The "Ultimate Taco Shaper" is a new kitchen gadget shaping device that forms a tortilla into a taco shell having a more circular u-shaped taco shell having a larger filling capacity than the known v-shaped taco shells. As the tortilla cooks the handle can be used to position the tortilla in different positions so that the entire tortilla is cooked completely and will cool into the round circular taco shell shape as it is being cooked. The shaper utensil itself allows ease of use with a main clip that moves in and out with a spring loaded steel open square shape for repeated use with a thumb and finger portion of the clip so that it is pressed inward and allows the tortilla to be placed on each side the round circular taco shell shaper portion. The clip holds the tortilla in place while the tortilla is being cooked in shallow oil in a frying pan. The thumb and finger portion is placed into the inset of the handle so that it is easy to get to and does not get caught on other things and it also provides protection for the skin of the finger or skin of the hand by being outside of the frying pan. There is a notch portion of the clip that allows the clip to set on the side of the frying pan without moving. When the tortilla is cooked it is then placed onto a surface and the clip releases the taco shell (cooked tortilla) in an upright position to be filled with food stuff. This invention is very easy to use and very easy to clean. The round circular taco shell shape holds more food stuff than a traditional taco shell and you will use as many taco shells and not have to cook as many. It makes it quick and easy to cook your own taco shells.

What is claimed is:

1. An ultimate taco shaper for use with a frying pan comprising:
    a handle comprising a main body, said main body of said handle comprising an inset portion;
    two main clips, said two main clips comprising a thumb and finger portion;
    said thumb and finger further comprising an additional portion, and
    a circular taco shell shape end comprising a shaper;
    wherein said two main clips and said shaper cooperate via spring loaded retainer;
    wherein said two main clips each comprise an end, said end is structured and arranged with said shaper and further structured and arranged with said spring loaded retainer for retaining an uncooked tortilla in place for cooking in shallow oil in a frying pan;
    wherein said inset portion of said handle is structured and arranged with said two main clips and further structured and arranged with said spring loaded retainer such that said two main clips that are structured and arranged to seat directly against said handle;

wherein said additional portion of said thumb and finger portion is structured and arranged with said two main clips enabling said two main clips to be pressed inwardly to cause an opposite end of said two main clips to transition into an open position for holding in place said uncooked tortilla; and wherein said ultimate taco shaper is designed to shape said uncooked tortilla into a circular taco shell, said circular taco shell suitable to contain an increased portion of food stuff within said circular taco shell.

2. The ultimate taco shaper of claim 1 wherein said handle comprises a hole useful for hanging said ultimate taco shaper on a hook.

3. The ultimate taco shaper of claim 2 wherein said two main clips each comprise a notch.

4. The ultimate taco shaper of claim 3 wherein said notch is structured and arranged with said two main clips for setting said ultimate taco shaper on a side of said frying pan.

5. The ultimate taco shaper of claim 4 wherein said notch is further structured and arranged with said two main clips for preventing movement of said ultimate taco shaper in relation to said frying pan.

6. The ultimate taco shaper of claim 5 wherein said thumb and finger portion is structured and arranged with said two main clips to provide protection for a skin area of a finger and alternatively a hand of said user.

7. An ultimate taco shaper for use with a frying pan comprising:

a handle comprising a main body, said main body of said handle comprising an inset portion, said handle further comprising a hole useful for hanging said ultimate taco shaper;

two main clips, said two main clips comprising a thumb and finger portion, said two main clips each further comprising a notch, said notch useful for setting said ultimate taco shaper on a side of said frying pan, said notch is further useful for preventing movement of said ultimate taco shaper in relation to said frying pan, said thumb and finger portion provides protection for a skin area of a finger and alternatively a hand of said user; and a circular taco shell shape end comprising a shaper;

wherein said two main clips and said shaper cooperate via spring loaded retainer;

wherein said two main clips each comprises an end, said end is structured and arranged with said shaper for retaining an uncooked tortilla in place for cooking in shallow oil in a frying pan;

wherein said inset portion of said handle is structured and arranged with said two main clips for said two main clips that are structured and arranged to seat directly against said handle;

wherein said thumb and finger portion comprises an additional portion, said additional portion is structured and arranged with said two main clips enabling said two main clips to be pressed inwardly to cause an opposite end of said two main clips to transition into an open position for holding in place said uncooked tortilla;

wherein said additional portion of said thumb and finger portion is further structured and arranged with said two main clips such that depression of said additional portion of said thumb and finger portion causes said opposite end of said two main clips to transition into a closed position; and wherein said ultimate taco shaper is designed to shape said uncooked tortilla into a circular taco shell, said circular taco shell is suitable to contain an increased portion of food stuff within said circular taco shell and release a cooked said circular taco shell for consumption.

\* \* \* \* \*